United States Patent
Jin et al.

(10) Patent No.: US 9,066,157 B2
(45) Date of Patent: Jun. 23, 2015

(54) METHOD AND SYSTEM FOR DYNAMICALLY WATERMARKING MEDIA

(75) Inventors: Luojun Jin, Waterloo (CA); Antonio Colantonio, Mississauga (CA); Dominic Anthony Doherty, Brampton (CA)

(73) Assignee: Rogers Communications Inc., Toronto (CA)

( * ) Notice: Subject to any disclaimer, the term of this patent is extended or adjusted under 35 U.S.C. 154(b) by 458 days.

(21) Appl. No.: 13/406,963

(22) Filed: Feb. 28, 2012

(65) Prior Publication Data

US 2013/0223671 A1 Aug. 29, 2013

(51) Int. Cl.
| | |
|---|---|
| H04L 29/06 | (2006.01) |
| G06F 21/00 | (2013.01) |
| H04N 21/8358 | (2011.01) |
| G06F 21/10 | (2013.01) |
| G06F 21/16 | (2013.01) |
| G06F 21/57 | (2013.01) |
| H04N 21/239 | (2011.01) |
| H04N 21/258 | (2011.01) |
| H04N 9/80 | (2006.01) |
| H04N 21/858 | (2011.01) |

(52) U.S. Cl.
CPC ............ *H04N 21/8358* (2013.01); *G06F 21/10* (2013.01); *G06F 21/16* (2013.01); *G06F 21/577* (2013.01); *H04N 21/2393* (2013.01); *H04N 21/25875* (2013.01)

(58) Field of Classification Search
CPC ....... G06F 21/10; G06F 21/16; G06F 21/577; H04N 21/8358; H04N 21/2393; H04N 21/25875
USPC .................... 380/201, 255; 713/176; 726/22; 382/100
See application file for complete search history.

(56) References Cited

U.S. PATENT DOCUMENTS

| | | | |
|---|---|---|---|
| 7,222,235 B1 * | 5/2007 | Mitsui ........................... | 713/176 |
| 2009/0080689 A1 * | 3/2009 | Zhao et al. .................... | 382/100 |
| 2010/0199084 A1 | 8/2010 | Hamilton | |
| 2012/0159174 A1 * | 6/2012 | Gregotski ..................... | 713/176 |

FOREIGN PATENT DOCUMENTS

WO    WO 2012103379 A1 *  8/2012

OTHER PUBLICATIONS

Olanrewaju, R.F. ; Khalifa, O.; "Digital audio watermarking; techniques and applications"; Computer and Communication Engineering (ICCCE), 2012 International Conference on DOI: 10.1109/ICCCE.2012.6271333; Publication Year: Jul. 2012, pp. 830-835.*
Milano, Dominic; White Paper: Content Control: Digital Watermarking and Fingerprinting, Rhozet a Business Unit of Harmonic Inc., 2004.

* cited by examiner

*Primary Examiner* — Kambiz Zand
*Assistant Examiner* — Courtney Fields
(74) *Attorney, Agent, or Firm* — Rowand LLP

(57) ABSTRACT

A dynamic watermark generation method and system in which the dynamic watermark may have a default length or a shorter length, and wherein the dynamic watermark is generated to have the determined length. The dynamic watermark is a locally-unique code that is used as an index to a database entry that identifies the subscriber that requested the media asset. In some instances, the entry may include a timestamp, a subscriber device identifier such as a MAC address or IP address, a subscriber identifier or ID number, and a media asset identifier such as a static ID. The static ID may include a code that indicates whether the dynamic watermark is of a default length or shorter. The length of the dynamic watermark may be partly based upon projected audience size for the requested media asset.

22 Claims, 4 Drawing Sheets

METHOD AND SYSTEM FOR DYNAMICALLY WATERMARKING MEDIA

COPYRIGHT NOTICE

A portion of the disclosure of this document and accompanying materials contains material to which a claim for copyright is made. The copyright owner has no objection to the facsimile reproduction by anyone of the patent document or the patent disclosure, as it appears in the Patent and Trademark Office files or records, but reserves all other copyright rights whatsoever.

FIELD

The present application generally relates to watermarking and, in particular, to a system and method for dynamically watermarking media.

BACKGROUND

Unauthorized copying of media subject to copyright has been a significant problem throughout the digital age. The ease with which digital media is copied, and often perfectly copied, has fueled the growth of the piracy industry. Often it is difficult to trace the source of an unauthorized copy of a digital audio or video work. Accordingly, it has become commonplace to insert watermarks into digital works to assist in identifying their origin. The watermarks may be inaudible code within an audio file, or changes to an image or series or images in a video that will not be noticeably visible to the viewer.

In some implementations, at the time of downloading or streaming a system will insert a dynamic watermark ID in the media. An example dynamic watermark ID is a concatenation of the MAC address of the downloading device and a timestamp or timecode. This is intended to pinpoint the device and time at which the media was downloaded so as to be able to identify that device as the source of unauthorized copies later if the copies are found to contain the dynamic watermark.

The dynamic watermarks used in existing systems are normally fixed-length bit codes specifying the MAC address and time-code. In some cases, the codes may be 24 bits, 48 bits, 60 bits, or some other fixed-length. The length of these watermarks present robustness challenges for some types of copying and the inclusion of the MAC address presents a potential privacy issue.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
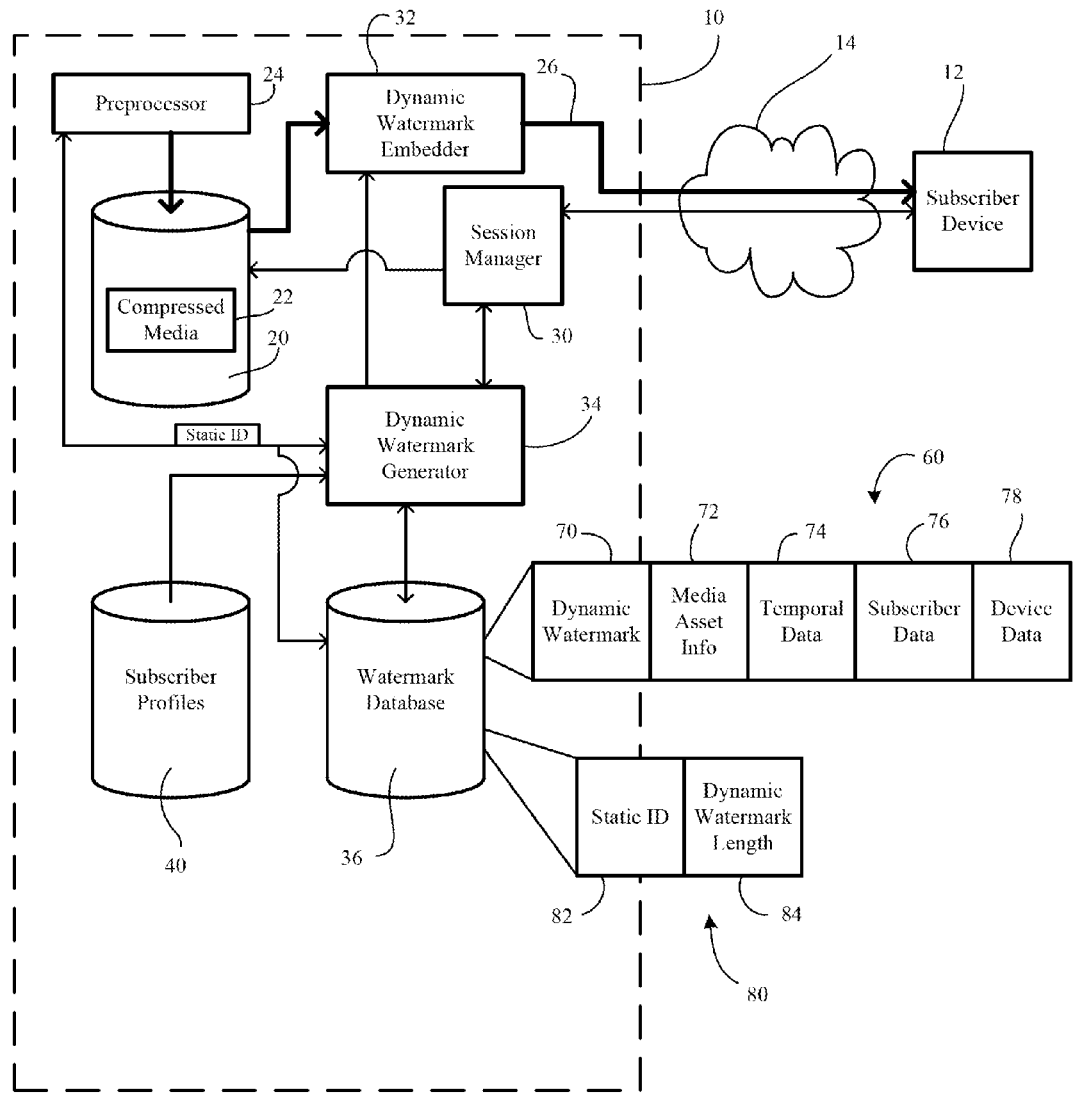
FIG. 1 diagrammatically shows an example media distribution system.

The present application describes a dynamic watermark generation method and system in which the dynamic watermark may have a default length or another length, and wherein the dynamic watermark is generated so as to have the determined length. The dynamic watermark is a locally-unique code that is used as an index to a database entry that identifies the subscriber that requested the media asset. In some instances, the entry may include a timestamp, a subscriber device identifier such as a MAC address or IP address, a subscriber identifier or ID number, and a media asset identifier such as a static ID. The static ID is embedded in the media and may include a code that indicates whether the dynamic watermark is of a default length or shorter. The length of the dynamic watermark may be partly based upon projected audience size for the requested media asset.

In one aspect, the present application describes a method of dynamically watermarking media in a media distribution system. The method includes receiving a request for a media asset from a subscriber device, wherein the request includes a subscriber identifier associated with a subscriber profile; generating a dynamic watermark, including determining a length for the dynamic watermark; storing, in a watermark database, the dynamic watermark as an index to an entry storing data identifying the subscriber profile and the requested media asset; embedding the dynamic watermark in the requested media asset; and transmitting the requested media asset having the embedded watermark to the subscriber device.

In another aspect, the present application describes a media distribution system for dynamically watermarking and distributing media. The system includes a media database containing media assets; a session manager configured to receive a request from for a media asset from a subscriber device, wherein the request includes a subscriber identifier associated with a subscriber profile; a watermark database; a dynamic watermark generator configured to determine the length for a dynamic watermark, to generate the dynamic watermark, and to store, in the watermark database, the dynamic watermark as an index to an entry storing data identifying the subscriber profile and the requested media asset; and a dynamic watermark embedder configured to embed the dynamic watermark in the requested media asset. The session manager is configured to cause the requested media asset having the embedded watermark to be transmitted to the subscriber device.

In yet a further aspect, the present application describes non-transitory computer-readable media storing computer-executable program instructions which, when executed, configured a processor to perform the described methods.

Other aspects and features of the present application will be understood by those of ordinary skill in the art from a review of the following description of examples in conjunction with the accompanying figures.

In the description that follows, some example embodiments are described with reference to the H.264 standard for video coding and/or the developing MPEG-H standard. Those ordinarily skilled in the art will understand that the present application is not limited to H.264/AVC or MPEG-H but may be applicable to other video coding/decoding standards, including possible future standards, multi-view coding standards, scalable video coding standards, and reconfigurable video coding standards.

In the description that follows, when referring to video the terms frame, picture, slice, tile and rectangular slice group may be used somewhat interchangeably. Those of skill in the art will appreciate that, in the case of the H.264 standard, a frame may contain one or more slices. In any particular embodiment, the applicable media coding standard may determine whether the operations described below are performed in connection with frames and/or slices and/or pictures and/or tiles and/or rectangular slice groups, as the case may be. Accordingly, those ordinarily skilled in the art will understand, in light of the present disclosure, whether particular operations or processes described herein and particular references to frames, slices, pictures, tiles, rectangular slice groups are applicable to frames, slices, pictures, tiles, rectangular slice groups, or some or all of those for a given embodiment.

Reference is first made to FIG. 1, which diagrammatically illustrates an example of a system 10 for dynamically watermarking media. The system 10 may be implemented, for example, by a media rental company, a mobile network operator, an internet service provider, or any other entity offering unicast or downloaded access to media assets, such as video. Certain details of implementation in various specific situations, such as server farms, load balancing, redundant facilities, and other components, are not discussed or illustrated so as to improve clarity of the following description.

A subscriber device 12 accesses the system 10 through a network 14. The network 14 may include wired and/or wireless networks and may include the Internet, mobile networks, or a combination thereof. The subscriber device 12 is any computing device configured to receive user input for selecting a media asset, to communicate with the system 10 over the network 14, and to receive and decode media assets. In some embodiments the subscriber device 12 may include a personal computer, a handheld mobile device, a tablet device, a set-top box, and Internet-ready television, or any other such computing device. In some cases, the subscriber device 12 includes a display screen for displaying the media asset; however, in some cases, such as a set-top box, the subscriber device 12 outputs decoded video and/or audio to another device, such as a monitor, television, or home theatre system.

The system 10 in this example includes a media assets database 20 containing a collection of compressed videos 22 and a pre-processor 24 that compresses (encodes) the videos to generate the compressed videos 22 stored in the media assets database 20. It will be appreciated that although the present example describes the media as being stored in a database, the present application is not limited to any particular type of database or, strictly speaking, to use of any particular database management system or any database management system. "Database" as it is used herein is intended in its broadest sense to include all computer-implemented memory storage systems that may be used to store media assets.

The pre-processor 24 generates the compressed video 22 for storage in the media assets database 20. The pre-processor 24 may use one or more video encoding processes for encoding the videos, including, for example, MPEG-2, MPEG-4, H.264/MPEG-4 AVC, H.263, MPEG-H, or any other video encoding format. The media assets are not necessarily limited to video and may, in some embodiments, include other media, including video games, audio, and other multi-media content.

The pre-processor 24 may embed a static watermark in the compressed video 22. The static watermark may be a static ID 82 embedded in the uncompressed video contents, for example as a unique binary code within the pixels of one or more of the pictures/frames/slices of the video.

A session manager 30 manages interactions with subscriber devices 12 and the handling of requests for access to media assets. The session manager 30 may include one or more web servers in some embodiments. In some instances, the session manager 30 may include various authentication and authorization components for verifying the identity and access entitlements of a subscriber and/or subscriber device 12. In some embodiments, the session manager 30 or a related component/server may implement billing associated with access to the media assets.

In this example embodiment, the session manager 30 receives a request for access to one of the compressed videos 22 from the subscriber device 12. The request may be in the form of an HTTP request in some instances. The session manager 30 (assuming authentication, if required, has already occurred), instructs a dynamic watermark generator 34 to generate a dynamic watermark 70. The dynamic watermark 70 is embedded in the requested compressed video 22 by a dynamic watermark embedder 32 to produce a watermarked requested compressed video 26. The watermarked requested compressed video 26 is then provided to the subscriber device 12. In some examples, the watermarked requested compressed video 26 may be streamed to the subscriber device 12. In some examples, the watermarked requested compressed video 26 may be downloaded by the subscriber device 12 and stored locally on the subscriber device 12, or an associated storage device, for playback.

The dynamic watermark 70 embedded in the compressed video 22 by the dynamic watermark embedder 32 is a locally-unique binary code associated with the subscriber and/or subscriber device 12. The dynamic watermark 70 does not contain the IP address or MAC address of the subscriber device 12 or any router or other network element associated with the subscriber device 12.

The dynamic watermark embedder 32 and the dynamic watermark generator 34 are shown as separate components in the present application for clarity of illustration. It will be understood that the functions of these components may be implemented on a common platform or device, such as a server. In one example, the functions of the dynamic watermark embedder 32 and the dynamic watermark generator 34 may be implemented within the same server or other computing device implementing the session manager 30.

The system 10 includes a watermark database 36. The watermark database 36 stores the dynamic watermark 70 generated by the dynamic watermark generator 34. The dynamic watermark 70 is stored in an entry in the watermark database 36 together with information identifying the subscriber and/or the subscriber device 12. The dynamic watermark generator 34 creates an entry 60 in the watermark database 36 and populates the entry 60 with the dynamic watermark 70 and related subscriber information. In one example embodiment, the entry 60 includes media asset information 72, temporal data 74, subscriber data 76, and device data 78. The media asset information 72 may include information identifying the media asset accessed by the subscriber. In one case, the media asset information 72 may be the static ID 82 associated with and embedded within the media asset. The temporal data 74 may include time and date information associated with receipt of the request from the subscriber device, for example. The subscriber data 76 may include information identifying and/or classifying the subscriber. The subscriber data 76 may be drawn from a subscriber profile database 40 based on login information obtained by the session manager 30 and/or an association between a subscriber and the identity of the subscriber device 12 from which the request was received. The device data 78 may include information identifying the subscriber device 12, such as a device type, IP address, MAC address or other device-specific data. The dynamic watermark 70 serves as the index to the database 36.

In some embodiments, the watermark database 36 may include media asset entries 80. The media asset entry 80 may include the static ID 82 or other identifying index for a particular media asset and may also include an associated dynamic watermark length 84. As will be described further below, the dynamic watermark generator 34 may determine whether to generate a watermark having a default length, e.g. 60 bits, or a watermark having a shorter length. The media asset entry 80 may indicate the length of the dynamic watermark for a particular asset so that it may be extracted when attempting to identify the source of an illegal copy of the media asset. In some embodiments, the watermark database 36 may only contain media asset entries 80 for those assets that have a dynamic watermark with a shorter-than-default length.

Advantageously, some embodiments of the system 10 allow for shorter-than-default dynamic watermarks. This may render the watermarks more robust than a longer watermark, particularly for brief media or for the purpose of identifying assets that are imperfectly duplicated, such as through camcorders, etc. The dynamic watermarking solution may also improve privacy protection by avoiding the embedding of MAC addresses, IP addresses, or other direct identifying data. Moreover, the system 10 may allow greater flexibility in tailoring watermark length to the service type and audience size. The system 10 also allows for the association of addition information with the watermark, as opposed to simply embedding a MAC address and timecode. The addition information may be advantageous in the situation where a roaming device accesses media through a home gateway, wherein the roaming device user is not the same as the subscriber that owns the home gateway. Using conventional watermarking, the media may be marked with the MAC address of the home gateway, possibly allowing the user of the roaming device to escape detection.

One possible technique for generating a dynamic watermark is to use a hash function. The hash function may have inputs that include a device type, IP address, MAC address, subscriber name, static ID, timecode, etc. Other possible inputs to the hash will be appreciated. Any perfect hash function may be used. A "perfect" hash function is one in which maps the distinct input elements to integers without any collisions. In many embodiments, a "minimal perfect hash" may be used. A minimal perfect hash maps n keys to n consecutive integers. The selected hash function produces a unique integer. The dynamic watermark is formed as the binary representation of that unique integer. The binary representation is expressed using a binary length determined by the dynamic watermark generator 34. The length may be selected by the dynamic watermark generator 34 based upon a number of factors including the service type, the media type, the prospective audience size, and any preset length associated with the static ID.

Figure 2:
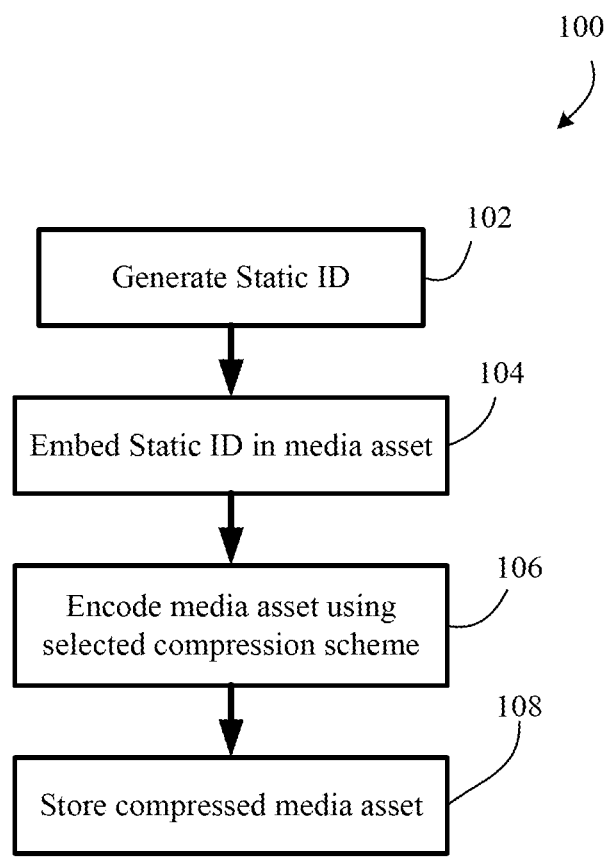
FIG. 2 shows, in flowchart form, an example method of watermarking a media asset.

Reference is now made to FIG. 2, which shows, in flowchart form, an example method 100 for encoding a media asset. The method 100 includes an operation 102 of generating a static ID for the media asset. The static ID identifies the media asset and may, in some embodiments, indicate additional information regarding media asset. For example, in one embodiment, the static ID includes a Distributor ID, which is a code that uniquely identifies the media asset. The static ID may also include a service/application category in some embodiments. The service/application category may indicate the type of service or application for which the media asset will be made available to subscribers. For example, the service or application types may include a premium service, or an early-release content service, etc. The availability of a media asset for such services may depend on the categories set by the service providers or content providers. The service/application category may also be associated with the specific access methods, such as adaptive streaming or download-and-play, etc., which again depends on the policies set by service providers or content providers.

In some examples, the static ID may include data that indicates whether the media asset has a default length dynamic watermark or a variable length dynamic watermark.

In one example, the static ID may be formed from the concatenation of the distributor ID, the server/application category code, and a dynamic watermark length code. In one example, the dynamic watermark length code may be a two-bit code in which 00 indicates a fixed default length dynamic watermark and 01 indicates a shorter length dynamic watermark. The codes 10 and 11 may be reserved for future use.

In operation 104, the static ID is embedded in the media asset. In one example, this may include embedding the static ID within a video, for example by embedding the static ID within one or more pictures, frames, slices, etc. of the video. Any technique for embedding a code within a media asset as a watermark may be used.

In operation 106, the media asset with the embedded static ID is encoded using a selected encoding scheme and compression ratio to generate a compressed media asset. Any suitable encoding scheme may be used for the media asset. For example, audio assets may be encoded using MPEG-2 Layer-3 (MP3), MP4, AAC, etc. Video assets may be encoded using H.264/AVC, MPEG-2, MPEG-H, etc. Other encoding schemes will be understood by those ordinarily skill in the art.

Once the media asset has been encoded/compressed, then the compressed media asset is stored in a database or other storage location in operation 108.

Figure 3:
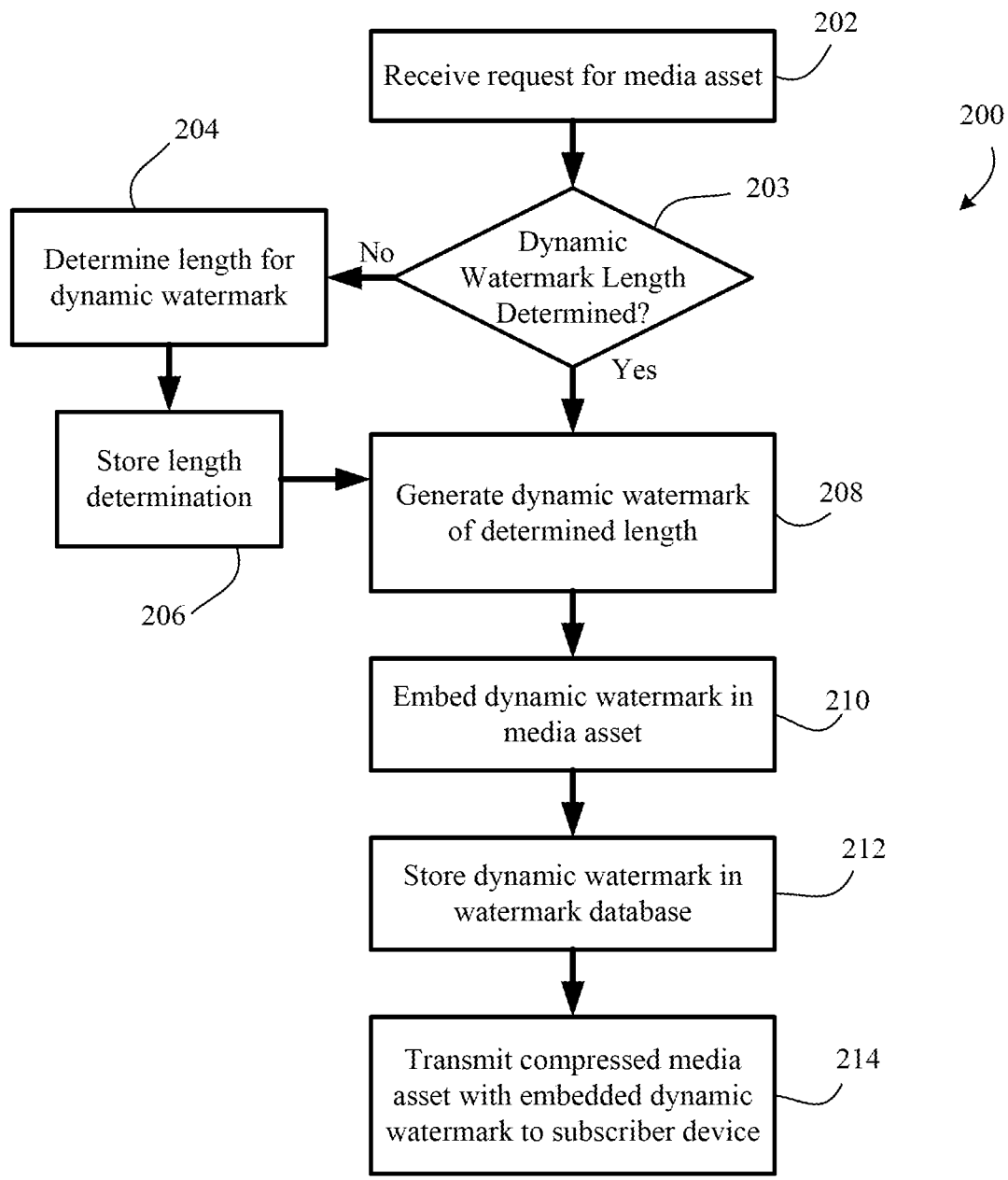
FIG. 3 shows, in flowchart form, an example method of generating and embedding a dynamic watermark in a compressed media asset.

Reference will now be made to FIG. 3, which shows a flowchart illustrating an example method 200 for dynamically watermarking a media asset. The method 200 may be implemented within a media distribution system in which download or streaming of media assets is offered to subscribers. The media distribution system thus maintains a database or repository of subscriber information and seeks to prevent unauthorized or illegal duplication and distribution of the downloaded or streamed media assets by watermarking the media assets. By dynamically watermarking the media asset, an unauthorized copy may be traced to a particular subscriber through extraction and identification of the dynamic watermark within the media asset.

The method 200 begins with receiving a request for a media asset in operation 202. The request may be received through a web interface, such as by way of selection of the media asset in a web portal. In some cases, the request may be received by way of a request message within a video-on-demand system provided over a distribution network, such as a wireless and/or cable system. Messages may conform to an industry standard messaging protocol in some embodiments. In other embodiments, messages may be in a proprietary format.

The request message causes the media distribution system or specifically, in one example, a dynamic watermark generator component, to determine whether the requested media asset uses a default length dynamic watermark or a variable length watermark. The dynamic watermark generator may make this determination by searching for a stored association between the media asset and a determined watermark length. In some implementations, this determination has been made and is indicated within the static ID associated with the media asset, as described above.

If the media asset has a shorter-than-default length dynamic watermark, then the dynamic watermark generator determines whether that length has been preconfigured in operation 203. If the length has been predetermined, it may be stored in memory, such as in a media asset entry 80 (FIG. 1) in the watermark database 36 (FIG. 1). In some instances, the length may not have been predetermined for the media asset, particular in the case where this is the first request to access the media asset. In such circumstances, the dynamic watermark generator or another component within the system may determine the length in operation 204. A number of factors may influence the determined length of the dynamic watermark, such as the expected size of the audience. For example, if the system has only ten thousand total subscribers, then the dynamic watermark need not be 40-bits long. It could be as short as 14 bits ($2^{14}$=16,384 unique codes). If the media asset is designated for a service or application that has a limited audience, such as premium subscribers or some other designated sub-group, then the dynamic watermark length may be tailored to that situation. Other factors may also influence the determination of a suitable length for the dynamic watermark.

In operation 206, the length determination is stored for use in subsequent requests for the same media asset. The storage may be by way of creation of a media asset entry 80 (FIG. 1) in the watermark database 36 (FIG. 1), for example.

In operation 208, the dynamic watermark generator generates the dynamic watermark having the determined length. In some implementations, inputs to the watermark generation process may include the subscriber ID, subscriber name, static ID, device type, MAC address, IP address, additional identifying data, or any combination thereof. The output of the dynamic watermark generation process is a unique binary code having the determined length.

The dynamic watermark is then embedded in the compressed media asset in operation 210. Any one of a number of techniques for embedding a binary code in a compressed media asset may be used. One example technique is to have two slightly different versions of the compressed media asset, e.g. an A version and a B version. In the case of video, the code may be embedded on a compressed frame or picture or slice basis (depending on the encoding scheme used), by choosing either the A version compressed frame/picture/slice or the B version in accordance with the code. Any differences between the A and B versions may be unnoticeable to the viewer. Other embedding techniques may also be used.

In operation 212, the dynamic watermark is stored in the watermark database in association with subscriber-identifying information, such as IP address, MAC address, subscriber information, time and date information, etc. The dynamic watermark may serve as an index to the database.

In operation 214, the compressed media with the dynamic watermark embedded is transmitted to the subscriber device in reply to the request. The transmission may be by download, streaming, etc.

Figure 4:
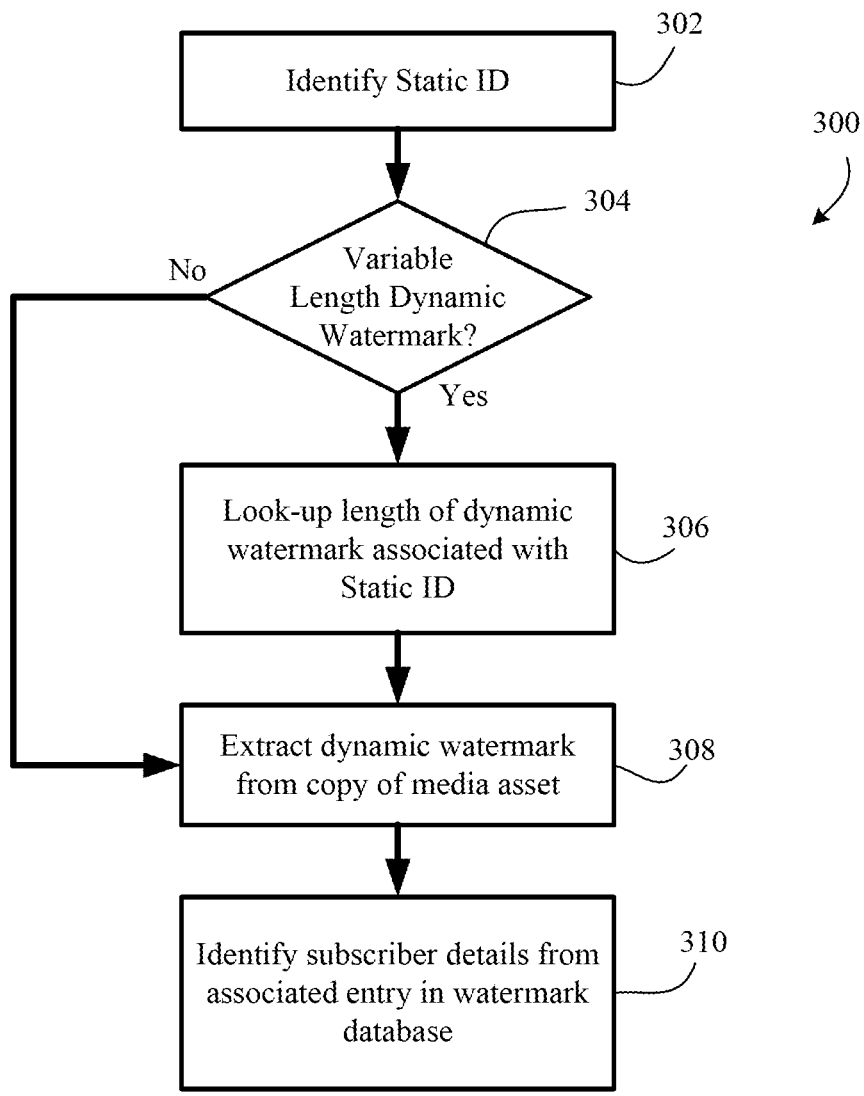
FIG. 4 shows, in flowchart form, an example method of identifying the source of an unauthorized copy of a media asset.

Reference is now made to FIG. 4, which shows a flowchart illustrating an example method 300 of identifying an unauthorized copy of a media asset. The method 300 includes identifying the static ID embedded in the unauthorized copy in operation 302. The static ID may, in one example, have encoded within it an indication of whether the dynamic watermark is a default length watermark or a variable length watermark. The encoding of that indication within the static ID is described above, in one embodiment. In operation 304, a determination is made as to whether the dynamic watermark is a default length watermark or not. This determination may be based upon the static ID in some cases. In some other cases, it may be determined by looking up stored information regarding the media asset.

If the dynamic watermark is determined to be of variable length (or if the static ID does not indicate whether the watermark is default length or not), then in operation 306 the length of the dynamic watermark is determined by looking up the stored association between the length of the dynamic watermark and the static ID. The media asset entry 80 (FIG. 1) is one example implementation of such a stored association. From this association, the length of the dynamic watermark is known and, thus, the dynamic watermark can be extracted from the unauthorized copy of the media asset in operation 308. The subscriber details associated with the dynamic watermark are then identified in operation 310 by querying the watermark database using the dynamic watermark. The subscriber information stored in association with the dynamic watermark identifies which subscriber obtained the media asset from the media distribution system. The information may also identify the precise device type, MAC address, IP address and time/date data associate with distribution of the media asset. Accordingly, the source of the unauthorized copy may be readily identified. Advantageously, any particular implementation of the present system may include in the stored subscriber information any contextual information that is deemed relevant, without being limited to the information embedded in the dynamic watermark itself. In other words, the dynamic watermark maps to a broad and customizable set of data for identifying a subscriber, a subscriber device, a media asset download event, and any other contextual information relevant to identifying unauthorized reproduction of media.

It will be appreciated that portions of the watermark detection process 300 may be performed by a third party. For example, the static ID and dynamic watermark extraction may be performed by a third party and the third party may provide the dynamic watermark to the media distribution system operator to obtain the corresponding subscriber information. In some cases, the third party may obtain the length of the dynamic watermark from the operator.

It will be appreciated that elements and components of the media distribution and watermarking system according to the present application may be implemented in a number of computing devices, including, without limitation, servers, suitably programmed general purpose computers, audio/video encoding and playback devices, etc. The dynamic watermark generator may be implemented by way of software containing instructions for configuring a processor to carry out the functions described herein. The software instructions may be stored on any suitable non-transitory computer-readable memory, including CDs, RAM, ROM, Flash memory, etc.

It will be understood that the system described herein and the module, routine, process, thread, or other software component implementing the described method/process for configuring the system may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of dynamically watermarking media in a media distribution system, the method comprising:
   receiving a request for a media asset from a subscriber device during a session, wherein the request includes a subscriber identifier associated with a subscriber profile;

generating a dynamic watermark, including determining a length for the dynamic watermark, wherein the dynamic watermark does not include information identifying the subscriber device, identifying the subscriber identifier, or identifying the session;

storing, in a watermark database, the dynamic watermark as an index to an entry storing data identifying the subscriber profile and the requested media asset;

embedding the dynamic watermark in the requested media asset; and transmitting the requested media asset having the embedded watermark to the subscriber device.

2. The method claimed in claim 1, wherein the requested media asset comprises a compressed video and wherein embedding the dynamic watermark includes embedding the dynamic watermark in the compressed video without first decompressing the compressed video.

3. The method claimed in claim 1, wherein generating the dynamic watermark includes generating a locally-unique binary number having that determined length.

4. The method claimed in claim 1, wherein generating the dynamic watermark includes using a hash function.

5. The method claimed in claim 4, wherein an input to the hash function includes at least one of the subscriber device MAC address, the subscriber device IP address, and a subscriber profile identifier.

6. The method claimed in claim 1, wherein storing includes creating an entry in the watermark database having the dynamic watermark as the index to the entry, and wherein the entry further includes subscriber identifying information, a timestamp, and requested media identifying information.

7. The method claimed in claim 1, further including preprocessing the media asset to embed a static ID identifying the media asset and to encode the media asset as a compressed media asset.

8. The method claimed in claim 6, wherein determining the length for the dynamic watermark includes reading the static ID, and wherein the static ID includes a code indicating either default length or variable length.

9. The method claimed in claim 8, wherein the code indicates variable length and wherein determining the length further includes reading the length of the dynamic watermark from a stored association between the static ID and the determined length.

10. The method claimed in claim 1, wherein determining the length for the dynamic watermark includes determining the length based at least upon projected audience size for the requested media asset.

11. A media distribution system for dynamically watermarking and distributing media, the system comprising:

a media database containing media assets;

a session manager configured to receive a request for a media asset from a subscriber device during a session, wherein the request includes a subscriber identifier associated with a subscriber profile;

a watermark database;

a dynamic watermark generator configured to determine the length for a dynamic watermark, to generate the dynamic watermark, and to store, in the watermark database, the dynamic watermark as an index to an entry storing data identifying the subscriber profile and the requested media asset, wherein the dynamic watermark does not include information identifying the subscriber device, identifying the subscriber identifier, or identifying the session; and a dynamic watermark embedder configured to embed the dynamic watermark in the requested media asset, and wherein the session manager is configured to cause the requested media asset having the embedded watermark to be transmitted to the subscriber device.

12. The media distribution system claimed in claim 11, wherein the media assets comprise compressed videos and wherein the dynamic watermark embedder is configured to embed the dynamic watermark by embedding the dynamic watermark in a compressed video without first decompressing the compressed video.

13. The media distribution system claimed in claim 11, wherein the dynamic watermark generator is configured to generate a locally-unique binary number having that determined length.

14. The media distribution system claimed in claim 11, wherein the dynamic watermark generator is configured to use a hash function for generating the dynamic watermark.

15. The media distribution system claimed in claim 14, wherein an input to the hash function includes at least one of the subscriber device MAC address, the subscriber device IP address, and a subscriber profile identifier.

16. The media distribution system claimed in claim 11, wherein the watermark database includes an entry with the dynamic watermark as the index to the entry, and wherein the entry further includes subscriber identifying information, a timestamp, and requested media identifying information.

17. The media distribution system claimed in claim 11, further including a preprocessor configured to embed a static ID into the media asset identifying the media asset and to encode the media asset as a compressed media asset.

18. The media distribution system claimed in claim 17, wherein the dynamic watermark generator is configured to determine the length for the dynamic watermark by reading the static ID, and wherein the static ID includes a code indicating either default length or variable length.

19. The media distribution system claimed in claim 18, wherein the code indicates variable length and wherein the dynamic watermark generator is configured to read the length of the dynamic watermark from a stored association between the static ID and the determined length.

20. The media distribution system claimed in claim 11, wherein the dynamic watermark generator is configured to determine the length for the dynamic watermark based at least upon projected audience size for the requested media asset.

21. A non-transitory processor-readable medium storing processor-executable instructions which, when executed, configures one or more processors to perform the method claimed in claim 1.

22. The method claimed in claim 1, wherein said media distribution system includes a default watermark length, and wherein said length for the dynamic watermark is shorter than said default watermark length.

* * * * *